United States Patent [19]
Pacifici et al.

[11] 3,988,229
[45] Oct. 26, 1976

[54] STABILIZED PHOTOPOLYMERIZABLE POLYMERIC COMPOSITIONS CONTAINING A PHOTOINITIATOR AND A NITRONE DERIVATIVE

[75] Inventors: James G. Pacifici; Gordon C. Newland, both of Kingsport, Tenn.

[73] Assignee: Eastman Kodak Company, Rochester, N.Y.

[22] Filed: Aug. 28, 1975

[21] Appl. No.: 608,812

[52] U.S. Cl. .................. 204/159.23; 204/159.18; 204/159.19; 204/159.24; 96/115 P; 427/54; 526/320; 526/328
[51] Int. Cl.² ................... C08F 2/46; C08F 4/00
[58] Field of Search .............. 204/159.18, 159.23, 204/159.24; 96/115 P

[56] References Cited
UNITED STATES PATENTS

| | | | |
|---|---|---|---|
| 3,481,739 | 12/1969 | Wainer et al. | 96/90 |
| 3,885,964 | 5/1975 | Nacci | 96/35.1 |
| 3,901,705 | 8/1975 | Pazos | 96/35.1 |
| 3,914,128 | 10/1975 | Scheiber et al. | 96/115 P |

*Primary Examiner*—Richard B. Turer
*Attorney, Agent, or Firm*—Clyde L. Tootle; Daniel B. Reece, III

[57] ABSTRACT

The invention relates to stabilized photopolymerizable or photocrosslinkable polymeric compositions having improved storage stability. These compositions are useful as coating and moldable compositions which are hardenable by ultraviolet radiation. These coating and moldable compositions comprise mixtures of photopolymerizable or photocrosslinkable unsaturated compounds, at least one photoinitiator and a particular nitrone.

8 Claims, No Drawings

STABILIZED PHOTOPOLYMERIZABLE POLYMERIC COMPOSITIONS CONTAINING A PHOTOINITIATOR AND A NITRONE DERIVATIVE

This invention relates to stabilized photopolymerizable polymeric compositions useful as coating and moldable compositions. More particularly, the invention relates to photopolymerizable compositions having improved storage stability which harden on exposure to ultraviolet radiation.

Heretofore it has been known to prepare coating and ink compositions consisting of photopolymerizable ethylenically unsaturated materials. It is also known that many of these photopolymerizable compositions have poor storage stability. Some of the photopolymerizable compositions have a shelf life of only one or two days before gellation and setting up occurs. It would therefore be an advance in the state of the art to provide photopolymerizable compositions having improved storage stability.

It is, therefore, an object of the present invention to provide such radiation curable compositions having improved storage stability.

Another object of the present invention is to provide useful photopolymerizable coating and moldable compositions characterized by improved storage stability.

It is still another object of the present invention to provide acrylate containing photopolymerizable compositions having improved storage stability.

It is a still further object of this invention to provide radiation curable acrylate containing compositions capable of curing when exposed to actinic radiation and especially ultraviolet radiation and which have improved storage stability.

Further objects and advantages of the invention will be apparent to those skilled in the art from the accompanying disclosure and claims.

In accordance with the present invention, photopolymerizable or radiation curable polymeric compositions are provided which contain ethylenically unsaturated compounds, a photoinitiator and from 0.001 to 0.3 weight percent of a nitrone having the following formula:

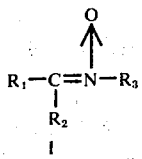

where $R_1$ is aryl or substituted aryl; $R_2$ is H, alkyl, cycloalkyl, araalkyl, aryl or substituted aryl; $R_3$ is tertiary alkyl or aryl.

The ethylenically unsaturated compounds useful in the present invention can be for example lower alkyl and substituted alkyl esters and amides of acrylic and methacrylic acid. Examples of such esters include: methyl methacrylate, ethyl methacrylate, 2-ethylhexyl methacrylate, isobutyl methacrylate, butyl acrylate, 2-ethylhexyl acrylate, 2-hydroxyethyl acrylate, 2-methoxyethyl acrylate, 2-hydroxypropyl acrylate, and the like. The unsaturated compounds can also be polyacrylyl compounds represented by the general formula:

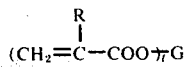

where R is hydrogen or methyl; G is a polyvalent alkylene group of the formula

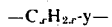

in which X is 2 to 10 and y is 0 to 2 (e.g., (a) divalent alkylene such as $C_xH_{2x}$ when $y = o$, i.e., $—C_2H_4—$, $—C_3H_6—$, $—C_5H_{10}—$, neo-$C_5H_{10}$ and the like; (b) trivalent alkylene such as $C_xH_{2x-1}$ when $y = 1$, i.e.,

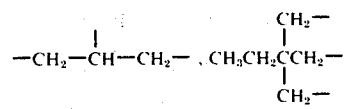

and the like; or (c) tetravalent alkylene such as $C_xH_{2x-2}$ when $y = 2$,

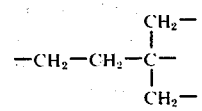

and the like); a divalent $-C_rH_{2r}O)_tC_rH_{2r}—$ group in which t is 1 to 10 (e.g., oxyethylene, oxypropylene, oxbutylene, polyoxyethylene, polyoxypropylene, polyoxybutylene, polyoxyethylene-oxypropylene, $—CH_2C(CH_3)_2COOCH_2C(CH_3)_2CH_2—$etc.); and r is the valence of G and can be from 2 to 4. The unsaturated compounds can also be allyl acrylates and methacrylates; e.g., allyl methacrylate, allyl acrylate, diallyl acrylate and the like. Other unsaturated compounds which may be used in the invention are, vinyl acetate, vinyl and vinylidine halides; e.g., vinyl chloride, vinylidine chloride, amides; e.g., acrylamide, diacetone acrylamide, vinyl aromatics; e.g., styrene, alkyl styrenes, halostyrenes, and divinyl benzenes.

In addition, unsaturated compounds which can also be used in the present invention are unsaturated polyester resins which are known in the art. Such polyesters may be prepared by reaction of α,β-unsaturated dicarboxylic acids can be replaced by saturated dicarboxylic acids or aromatic dicarboxylic acids, e.g., isophthalic acid and the like. Polyhydric alcohols are preferably dihydric alcohols such as ethylene glycol, however, trihydric and polyhydric alcohols such as trimethylolpropane can also be conjointly used. Examples of such α,β-unsaturated dicarboxylic acids or their anhydride counterparts include maleic, fumaric, itaconic and citraconic and the like.

The above unsaturated compounds can be used alone or as mixtures of such compounds or mixtures in combination with other unsaturated components and the like.

The photoinitiators used in the present invention can be conventional initiators known in the art. Such initiators include benzils, benzoin ethers, halomethyl ketones, aromatic substituted aliphatic ketones and aromatic ketones in combination with amines as well as, for example, 2-chloromethyl benzoxazole, 2-chloromethyl-5-tertbutyl benzoxazole, 2-chloro methyl-6-tertbutyl benzoxazole, 2-(p-α-chlorotolyl)benzoxazole, 2-(p-α-chlorotolyl)-5-tertbutyl benzoxazole, 2-(p-α-chlorotolyl)-6-tertbutyl benzoxazole, 2-(p-α-chlorotolyl)-5-chloro benzoxazole, 2-(p-α-chlorotolyl)-6-chlorobenzoxazole, 2-(p-α-chlorotolyl)-5-phenylbenzoxazole, 2-(p-α-chlorotolyl)-6-phenylbenzoxazole, 2-bromomethyl benzoxazole, 2-(p-α-bromotolyl)benzoxazole, 2-(p-α-bromotolyl)-5-tertbutyl benzoxazole, 2-(p-α-bromotolyl)-6-tertbutyl benzoxazole, 1-ethyl-2-chloromethyl benzimidazole, 1-ethyl-2-bromomethyl benzimidazole, 1-ethyl-2-(p-α-chlorotolyl)benzimidazole, 1-ethyl-2-(p-α-chlorotolyl)-5-tertbutyl benzimidazole, 1-ethyl-2-(p-α-chlorotolyl)-6-tertbutyl benzimidazole, 1-ethyl-2-(p-α-chlorotolyl)-5-phenyl benzimidazole, 1-ethyl-2-(p-α-chlorotolyl)-6-phenyl benzimidazole, 2-chloromethyl benzothiazole, 2-bromomethyl benzothiazole, 2-(p-α-chlorotolyl)benzothiazole, 2-(p-α-bromotolyl)benzothiazole, 2-(p-α-chlorotolyl)-5-tertbutyl benzothiazole, 2-(p-α-chlorotolyl)-6-tertbutyl benzothiazole, 2-(p-α-chlorotolyl)-5-phenyl benzothiazole, 2-(p-α-chlorotolyl)-6-phenyl benzothiazole, 2-(p-α-dichlorotolyl) benzoxazole and the like.

The photoinitiators may be added at any time in the production of photopolymerizable or photocrosslinkable unsaturated compositions in amounts conventionally used for photoinitiators. They are generally used in amounts of from 0.01 to 25%, preferably in amounts of from 0.5 to 15% by weight, based on the weight of the unsaturated compound.

The ultraviolet stabilized photopolymerizable compositions of the present invention may also contain other additives, pigments, colorants, stabilizers and the like. For example, polymeric compositions, such as unsaturated polyesters may also contain and generally do contain other additives such as white or colored pigments or colorants, antioxidants, plasticizers, flow aids, processing aids, polymeric modifiers and the like.

This invention will be further illustrated by the following examples although it will be understood that these examples are included merely for purposes of illustration and are not intended to limit the scope of the invention.

EXAMPLE 1

The nitrones useful in the present invention can be prepared according to the following procedures:

N,α-Diphenylnitrone (I) — A mixture of benzaldehyde (5.3 g. 0.05 mol.), phenylhydroxylamine (5.4 g. 0.05 mol.) and 25 ml. of ethanol was heated at reflux for 30 minutes under nitrogen. Partial evaporation of the ethanol provided a crystalline material which was isolated by filtration. Isolated was 8.0 g., (81% yield of N,α-diphenylnitrone, m.p. 110–111 (lit. 111°); infrared (KBr) 1570 (w), 1543 (s), 1190 (s) cm$^{-1}$.

α-4-Carbomethoxyphenyl-N-phenylnitrone (II) — A mixture of 8.2 g. (0.05 mole) of methyl formylbenzoate, 5.45 g. (0.05 mol.) of phenylhydroxylamine in 50 ml. of ethanol was heated for 30 minutes at reflux. Cooling the solution afforded a pale yellow solid which was isolated by filtration. The product was redissolved in ethanol, treated with activated charcoal and filtered. Isolated by crystallization was 9.1 g. (0.036 mole, 71.5%) of α-4-carbomethoxyphenyl-N-phenylnitrone. Melting point (recryst EtOH) 158°–159°; infrared (KBr), 1708 (s), 1560 (w), 1540 (s), 1268 (s) cm$^{-1}$; nmr. (CDCl$_3$), 3.96 (s, 3H), 7.30–7.55 (m, 3H), 7.74 (q, 2H), 7.96 (d, 2H), 7.97 (s, 1H), 8.38 ppm (d, 2H).

Ultraviolet spectrum (CH$_3$OH) λmax. 233 nm., ε = 8.735, 322 nm., ε = 19,136 M$^{-1}$ cm$^{-1}$.

Anal. calcd. for C$_{15}$H$_{13}$O$_3$N: C, 70,57; H, 5.13; N, 5.48. Found: C, 70,24; H, 5.20; N, 5.42.

α-4-Carbomethoxyphenyl-N-t-butylnitrone (III) — A mixture of 8.2 g. (0.05 mole) of t-butylhydroxylamine in 20 ml. of ethanol was heated at reflux for 30 minutes. Cooling the solution provided a white crystalline solid which was isolated by filtration and recrystallized twice from ethanol/water. Isolated was 9.8 g. (.041 mole, 83.5%) of α-4-carbomethoxyphenyl-N-t-butylnitrone m.p. 96°–96°; infrared (KBr) 1708 (s), 1560 (m), 1540 (s), 1272 (s) cm$^{-1}$; nmr (CDCl$_3$), 1.57 (s, 9H), 3.82 (s, 3H), 7.63 (s, 1H), 7.94 (d, 2H), 8.30 ppm (d, 2H). Ultraviolet spectrum (CH$_3$OH) λmax. 221 nm., ε = 8,635, λmax. 307 nm., ε = 19,429 M$^{-1}$ cm$^{-1}$.

Anal, calcd. for C$_{13}$H$_{17}$NO$_3$: C, 66.36; H, 7.28; N, 5.95. Found C, 66.37; H, 7.25; N, 5.87.

α-3,5-Di-t-butyl-4-hydroxyphenyl-N-t-butylnitrone (IV) — A mixture of 4.86 g. (0.02 mole) of 3,5-di-t-butyl-4-hydroxybenzaldehyde, 0.4 g. (0.04 mole of t-butylhydroxylamine in 25 ml. of ethanol was heated at reflux for 12 hours. The solution was cooled and the product isolated by filtration. Isolated was 5.6 g. (75% after two recrystallizations), α-3,5-di-t-butyl-4-hydroxyphenyl-N-t-butylnitrone; melts with decomposition 225°–228°; infrared (KBr) 1570 (w), 1350 (s) 1190 (s) cm$^{-1}$; infrared (CDCl$_3$) 3650 cm$^{-1}$ (s); nmr (CDCl$_3$) 1.45 (s, 18H) 1.58 (s, 9H), 5.6 (s, 1H), 7.40 (s, 1H), 8.16 ppm. (s, 2H). Ultraviolet spectrum (CH$_3$OH), λmax. 231. nm., ε = 9.582, λmax. 304 nm., ε = 22,757.

Anal. calcd. for C$_{19}$H$_{31}$NO$_2$: C, 74.71; H, 10.23; N, 4.58. Found: C, 74.57; H, 10.23; N, 4.55.

α-4-Nitrophenyl-N-t-butylnitrone (V) — A mixture of 7.55 g. (0.05 mole) of p-nitrobenzaldehyde, 5.0 g. (0.05 mole) of t-butylhdroxylamine and 50 ml. of ethanol was heated at reflux for 2 hours. Cooling the solution afforded a yellow crystalline solid which was isolated by filtration. Recrystallization from isopropyl alcohol afforded 11.0 g. (99% yield) of α-4-nitrophenyl-N-t-butylnitrone, m.p. 144°–146°; infrared (KBr) 1590 (s), 1550 (S), 1512 (s), 1496 (s), 1188 (s) cm$^{-1}$; nmr (CDCl$_3$), 1.61 (s, 9H), 7.72 (s, 1H), 8.06 (d, 2H), 8.41 ppm. (d, 2H). Ultraviolet spectrum (CH$_3$OH), λmax. 246, ε = 8,776, λmax. 336, ε = 12,663.

Anal. calcd. for C$_{11}$H$_{14}$N$_2$O$_3$: C, 59,45; H, 6.35; N, 12.60. Found: C, 59.52; H, 6.36; N, 12.83.

α-4-Carboxyphenyl-N-t-butylnitrone (VI) — A mixture of 7.5 g. (0.05 mole) of 4-carboxybenzaldehyde, 5.0 g. (0.05 mole) of t-butyl-hydroxylamine and 50 ml. of ethanol was heated for 2 hours at reflux. Cooling the solution afforded a white crystalline solid which was isolated by filtration. Recrystallization from isopropyl alcohol gave 8.3 g. (75.3% yield) of α-4-carboxyphenyl-N-t-butylnitrone; m.p. 225°–228° (dec.); infrared (KBr) 1695 (s), 1600 (w), 1585 (w), 1250 (s) cm$^{-1}$; nmr. (CDl$_3$), 1.58 (s, 9H), 7.69 (s, 1H), 7.95 (d, 2H), 8.31 (d, 2H), 11.0 ppm. (s, 1H).

Purity of material determined from neutralization equivalent was 97%; calcd. 221.24, found 214.7.

α,α-(1,4-Phenylene)-N-t-butyl Dinitrone (VIII) — A mixture of 6.7 g. (0.05 mole) of terephthaldicarboxaldehyde, 10.0 g. (0.10 mole) of t-butylhydroxylamine and 50 ml. of ethanol was heated for 2 hours at reflux. Cooling the solution provided a pale yellow solid. Recrystallization from isopropyl alcohol gave 11.6 g. (84.5% yield) of α,α-(1,4-phenylene)-N-t-butyl dinitrone, m.p. 218°–222° (dec.); infrared (KBr), 1560 (s), 1545 (w), 1190 (s) cm$^{-1}$; nmr (CDCl$_3$), 1.58 (s, 18H), 7.53 (s, 2H), 8.25 ppm. (s, 4H).

EXAMPLE 2

The following compositions were prepared and aged in an oven at 50° C.; the results are given in Table 1.

Table I

| Composition | | Nitrone (%) | Ovenlife |
|---|---|---|---|
| NPG-diacrylate + 5% IBBE | I | (0.1) | >2000 |
| NPG-diacrylate + 5% IBBE | II | (0.1) | >2000 |
| NPG-diacrylate + 5% IBBE | III | (0.1) | >2000 |
| NPG-diacrylate + 5% IBBE | IV | (0.1) | >2000 |
| NPG-diacrylate + 5% IBBE | V | (0.1) | >2000 |
| NPG-diacrylate + 5% IBBE | VI | (0.1) | >2000 |
| NPG-diacrylate + 5% IBBE | VII | (0.1) | >2000 |
| NPG-diacrylate + 5% IBBE | None | | 113 |
| TMPT + 5% IBBE | None | | 69 |
| TMPT + 5% IBBE | VII | (0.1) | 694 |
| TMPT + 5% FI-2 | None | | 120 |
| TMPT + 5% FI-2 | VII | ((0.1) | 960 |
| NPG-diacrylate + 5% FI-2 | None | | 152 |
| NPG-diacrylate + 5% FI-2 | VII | (0.1) | >2000 |

NPG — Neopentylglycol
IBBE — Isobutylbenzoin ether
TMPT — Trimethylolpropane triacrylate
FI-2 — 4,4'-Bis isopropoxycarbonylbenzoin isopropyl ether These photopolymerizable compositions find particular utility as ultraviolet curable films and coatings. Such compositions include unsaturated polymeric compositions and a photoinitiator. Such unsaturated polymeric compositions are, for example, unsaturated polyester and polyurethane compositions, which can also contain minor amounts of poly-α-olefins, polyamides, acrylics, cellulose esters, rubbers both synthetic and natural and the like. Such compositions can be molded or shaped into articles or applied as coatings.

The invention has been described in detail with particular reference to preferred embodiments thereof, but it will be understood that variations and modifications can be effected within the spirit and scope of the invention.

We claim:
1. A stabilized radiation-curable coating composition comprising:
   a. at least one ethylenically unsaturated compound,
   b. at least one photoinitiator, and
   c. from about 0.001 to about 0.3 weight percent of a nitrone having the formula:

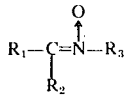

wherein R$_1$ is aryl or substituted aryl; R$_2$ is H, alkyl, cycloalkyl, araallyl, aryl or substituted aryl; and R$_3$ is tertiary alkyl or aryl.

2. A stabilized radiation-curable coating composition according to claim 1 wherein said nitrone is N,a-diphenylnitrone.

3. A stabilized radiation curable coating composition according to claim 1 wherein said nitrone is α-4-carbomethoxyphenyl-N-phenylnitrone.

4. A stabilized radiation-curable coating composition according to claim 1 wherein said nitrone is α-carbomethoxyphenyl-N-t-butylnitrone.

5. A stabilized radiation curable coating composition according to claim 1 wherein said nitrone is α-4-nitrophenyl-N-t-butylnitrone.

6. A stabilized radiation-curable coating composition according to claim 1 wherein said nitrone is α,α-(1,4-phenylene)-N-t-butyldinitrone.

7. A stabilized radiation curable coating composition according to claim 1 wherein said nitrone is α-4-carboxyphenyl-N-t-butylnitrone.

8. A stabilized radiation curable coating composition according to claim 1 wherein said nitrone is α-phenyl-N-t-butylnitrone.

* * * * *